United States Patent

Schagen

[15] 3,665,184

[45] May 23, 1972

[54] MULTI-COLORED STEREOSCOPIC X-RAY IMAGING AND DISPLAY SYSTEMS

[72] Inventor: Pieter Schagen, Redhill, England

[73] Assignee: U.S. Philips Corporation, New York, N.Y.

[22] Filed: Aug. 11, 1970

[21] Appl. No.: 62,853

[30] Foreign Application Priority Data

Aug. 21, 1969 Great Britain.......................41,704/69

[52] U.S. Cl..............................250/60, 178/6.5, 250/71.5 S, 250/83.3 R, 250/213 VT

[51] Int. Cl.........................................................G01n 23/04

[58] Field of Search....................250/60, 61, 71.5 S, 213 VT, 250/83.3 R; 178/6.5

[56] References Cited

UNITED STATES PATENTS

| | | | |
|---|---|---|---|
| 1,995,054 | 3/1935 | Chambers | 250/60 |
| 2,730,566 | 1/1956 | Bartow et al. | 250/60 X |
| 3,309,519 | 3/1967 | Euler et al. | 250/60 |

*Primary Examiner*—Morton J. Frome
*Attorney*—Frank R. Trifari

[57] ABSTRACT

X-ray imaging and display apparatus comprise means for switching an X-ray source sequentially between two or more voltage levels so as to generate X-rays of different energies and a switchable multi-color filter or image converter with means for switching the color of the filter or converter automatically in accordance with changes in X-ray energy.

The system may employ a switchable multi-color filter or an image converter tube having a multi-color screen of the "-penetron" type.

If a switchable polarization system is added, the apparatus can provide steroscopic pictures in color.

1 Claim, 7 Drawing Figures

Patented May 23, 1972 3,665,184

3 Sheets-Sheet 1

INVENTOR.

BY PIETER SCHAGEN

Frank R. Trifari

AGENT

*INVENTOR.*

*BY* PIETER SCHAGEN

AGENT

INVENTOR

BY PIETER SCHAGEN

Frank R. Jeffers

AGENT

MULTI-COLORED STEREOSCOPIC X-RAY IMAGING AND DISPLAY SYSTEMS

This invention relates to X-ray imaging and display systems. It is known that the contrast in X-ray images can be substantially improved with the aid of color reproduction. A technique has been specially developed for this purpose (see e.g. W. J. Oosterkamp et al; Phil. Techn. Tijdschr. 27, No. 8/9, p. 224, 1965/66), which uses two single exposures of the human body at different times with and without a specially injected absorbent. The two images are then processed and combined into a single two-color picture.

A different technique has been proposed which is based on the fact that X-rays of different energies will be absorbed in a different way by the various tissues and bones and will therefore produce images of different contrast and different detail. In addition, this kind of technique can provide quasi-continuous operation of the X-ray equipment enabling the observation of moving pictures in two or more colors representing different X-ray hardnesses. Such a technique is described in U. S. Pat. No. 1,995,054 (K. D. Chambers) where the X-ray sources of FIG. 2 are switched between two voltage levels, thus flooding the subject sequentially with X-rays of different energies. At the same time the color of the display corresponding to each X-ray source is changed synchronously with the X-ray tube switching.

A disadvantage of the latter system lies in the use of a rotating color filter for the display. In fact, whereas the X-ray energy is changed simultaneously for the whole picture (by switching the X-ray tube circuit), the color of the display is changed gradually by the rotation of the filter so that different parts of the picture change in color at different times.

One way of overcoming this disadvantage would be to pulse the X-ray tube on during short time intervals which coincide with the instants when any one of the filters covers the complete picture. The disadvantage remains however of the necessity to employ mechanically moving parts.

Another example of the above technique is given in U. S. Pat. No. 2,730,566 (J. B. Bartow et al). FIG. 16 shows an X-ray tube and a tri-color scanned C. R. T. display of the "-penetron" type so arranged that both tubes have their applied voltage or extra-high tension supplies switched sequentially to produce X-rays of three hardnesses and three corresponding colors for the display. Although the use of a color selection disc is avoided by the use of a scanned penetron screen tube, the system suffers from the inherent problems of such tubes and from another disadvantage in that it relies on the use of a scanning X-ray tube with its complications and intrinsically limited resolution.

Reverting to the problem of the discrepancy in timing between a switched X-ray tube and a rotating filter synchronized therewith, this problem can also arise if two X-ray tubes of constant hardness are used to provide a stereoscopic picture as in the arrangement of FIG. 1 of the Chambers Patent. If (as will usually be the case in practice) the two images produced by the two tubes overlap, then the said images can be separated by switching the X-ray tubes on and off alternately.

According to a first aspect, the present invention provides X-ray imaging and display apparatus comprising a non-scanning X-ray source, means for switching said source sequentially, a switchable multi-color image converter and display system capable of changing simultaneously the color of the whole field of the display, and means for actuating the display color switching means automatically in synchronism with the switching means of the X-ray source.

The present invention may employ apparatus wherein the means for switching the X-ray source are adapted to switch the latter between two or more voltage levels so as to generate X-rays of different energies and consequently cause the color of the display to be switched in accordance with changes in X-ray energy.

The present invention may employ apparatus wherein the X-ray source comprises two X-ray tubes so positioned as to provide a stereoscopic pair of pictures of an object, and wherein the means for switching the X-ray source are adapted to switch the said two tubes alternately on and off, the display system being of a two-color type suitable for providing a stereoscopic display of the anaglyph type when viewed through appropriate left and right color filters.

The invention can also provide a combined color and stereoscopic display with the aid of light polarizing means as will be explained.

The invention will be described with reference to the accompanying drawing in which.

A. A fluorescent screen for converting the single or double X-ray image into a visible black and white image, the said screen being combined with a switchable color filter through which the screen can be viewed. The color filter is one which can be switched electrically to transmit only light of one color at a time, which is the same for the whole field of the display. Such color filters are known and examples thereof will be given later. The term "white" is used in a broad sense since, of course, the degree of purity required depends very much on the X-ray application and will be quite low in cases where the colors are only used for anaglyph purposes.

B. A luminescent screen for converting the single or double X-ray image into a monochrome light image (not necessarily white or even visible — it could be ultra-violet) followed by an image converter which has a fluorescent output screen of which the color can be altered by modifying the potentials on one or more of its electrodes. Said screen may be of the "-penetron" type as described, e.g. in U. S. Pat. No. 2,730,653, or British Pat. No. 1,000,064 or in one or more of U. S. Patent Nos. 2,493,200 , 2,632,045 , 2,730,653 , 3,204,143 , 3,231,775 and 3,275,466. In particular, the image converter may be a vacuum tube of the type described in application Ser. No. 62,852, filed concurrently herewith. The monochrome input screen may be incorporated into such a tube and combined with its photocathode in a sandwich arrangement.

C. An arrangement similar to the one defined above under (B) but modified by the omission of the monochrome input screen and photocathode. The latter are replaced by the channel intensifier device or channel plate of an X-ray image intensifier system in accordance with U. S. Pat. No. 3,394,261 having a switchable "penetron" type output screen in accordance with the copending application.

Figure 1:
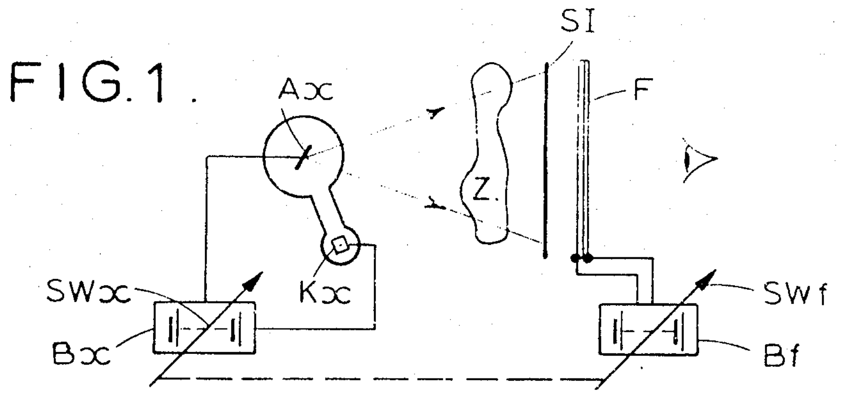
FIG. 1 shows diagrammatically a simple X-ray imaging and display device according to the invention.

Referring to FIG. 1, the X-ray imaging and display apparatus comprises an X-ray source which employs an X-ray tube having a target or anode Ax and a cathode Kx supplied by high voltage source Bx.

This source can irradiate a body Z and cast a shadow or X-ray image thereof on a screen SI which may be a conventional multi-layer structure for absorbing the X-rays and converting them into visible light with the aid of a phosphor layer.

The screen SI is viewed through a switchable color filter F as aforesaid, such filter being shown controlled by a switch SWf so as to vary the extra high voltage from a source Bf and transmit sequentially light of two or three different colors.

The light emitted by screen SI need only be white in the sense of containing radiation of wavelengths appropriate to the three color settings of the filter F.

The switch SWf is actuated sequentially and automatically in synchronism with a switch SWx which changes the extra high voltage and hence the wavelength or "hardness" of the X-rays emitted from target Ax, and a sufficiently high switching rate is used to avoid color flicker.

Figure 2:
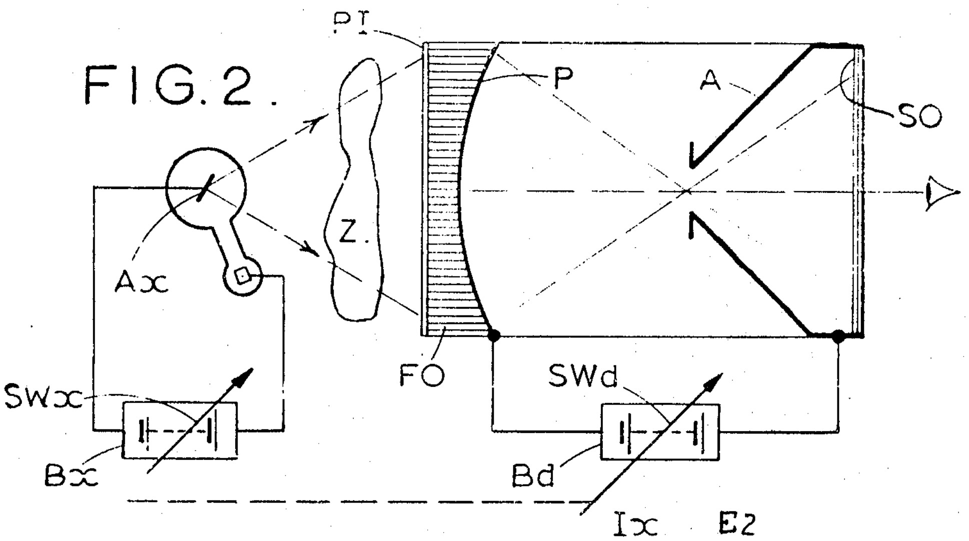
FIG. 2 shows diagrammatically another embodiment of the invention.

Referring now to FIG. 2, a vacuum tube is employed which is an electrostatic tube of the kind described in said copending application in which different layers of a "penetron" type display screen SO are brought into action by changing sequentially the acceleration and energy of the electrons emitted by the photo-cathode P. The fluorescent screen of this electrostatic image intensifier thus emits light of different colors depending on the energy of the incident electrons and it may have a multi-layer structure or multi-layer phosphor grains. The potential of the screen SI in the intensifier is switched in sequence with that of the X-ray tube to produce different output colors of the phosphor screen for different X-ray input energies. Again, a sufficiently high switching rate is used to avoid color flicker.

Referring to FIG. 2 in greater detail, the X-ray imaging and display apparatus comprises, again, an X-ray source which employs an X-ray tube having a target or anode Ax and a cathode Kx supplied by a high voltage source Bx.

This source can irradiate a body Z and cast a shadow or X-ray image thereof on a screen or pre-converter stage PI which may, again, be a conventional multi-layer structure for absorbing the X-rays and converting them into visible light with the aid of a phosphor layer, or it may convert the X-rays into ultra-violet radiation.

The pre-converter PI is coupled to the photo-cathode P of the electrostatic image intensifier stage, the latter being of the so-called "electron-optical diode" type having image-inverting properties. The said photo-cathode P may be concave, as shown, in which case it may advantageously be coupled to the PI stage via a fiber optic plate FO (as shown), which plate permits the PI stage to be flat (or even curved in the opposite sense if desired) and may form one wall of the tube envelope.

The photo-cathode P is followed by a conical or approximately conical anode A which acts as an electron-optical system to focus an inverted electron image on the luminescent display or output screen SO. The latter has an associated conductive layer in known manner and said layer may (as shown) be electrically connected to the anode A and with it to a common supply terminal of a high-voltage source Bd.

The "penetron" screen SO may be formed in layers as described e.g. in U. S. Pat. No. 2,730,653 or by C. Feldman in J. Opt. Soc. of America (September 1957, pp 790 et seq), i.e. it may comprise a plurality of phosphor layers (for example, red, green and blue) which are superimposed and are adapted to luminesce in different colors. The high-voltage supply Bd can be switched (by Swd) between three potentials. At the lower potential the lower-energy electrons excite substantially only the first phosphor layer and produce an image in a first color. When Swd is switched to a higher potential, the resulting higher-energy electrons penetrate through the first phosphor layer without much absorption thereby and reach the second layer thereby producing an image substantially in the color of the second phosphor. Similarly the third layer can be energized by a still higher potential.

The switch Swd is actuated sequentially and automatically in synchronism with the switch Swx which changes the wavelength or "hardness" of the X-rays emitted from target Ax.

The circuit shown is relatively simple since both of the tubes (the X-ray tube and the image converter stage P-A-SO) are essentially diodes so that only one supply voltage needs to be switched in each case. However, as is explained in the copending application the focusing of the inverted image on the screen SO can be maintained without change in image size or loss of quality even if two or more electrodes are used in lieu of the single anode A, provided that the values of the various electrode potentials are held in constant ratios when switched.

Figure 3:
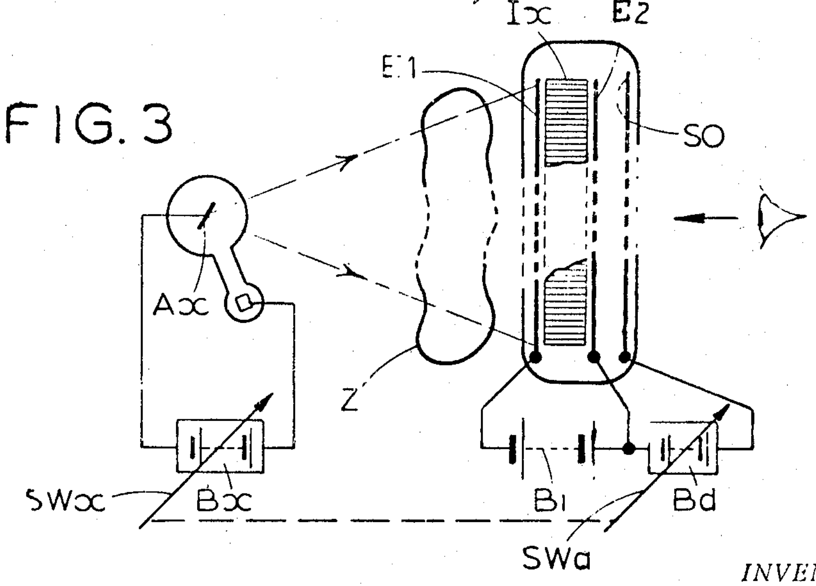
FIG. 3 shows still another embodiment of the invention.

The arrangement of FIG. 3 is similar to that of FIG. 2 except that the image converter stage employs a tube of the proximity (as opposed to image-inverting) type in which the preconverter stage PI and photo-cathode P are replaced by a channel intensifier device or channel plate having an X-ray absorbent matrix as described in U.S. Pat. No. 3,394,261. Briefly, a "channel" intensifier device is a secondary-emissive electron-multiplier device comprising a matrix in the form of a plate having a large number of elongated channels passing through its thickness, said plate having a first conductive layer on its input face and a separate second conductive layer on its output face to act respectively as input and output electrodes.

As is explained in the latter U. S. Patent, the elimination of the photo-cathode layer is possible because it has been found that some of the material suitable for the construction of the matrix of the channel intensifier device are also good X-ray absorbers in the energy range used for diagnostic radiology. This means that a substantial fraction of the full depth of thickness of the matrix can be used to absorb usefully the X-rays (by causing photo-emission mainly in the body of the matrix) with relatively little risk of transverse diffusion of photoelectrons. A typical material for the channelled matrix is a lead glass.

In FIG. 3, the channel plate is shown at Ix in proximity relationship to the penetron screen SO, i.e. these two elements are close enough to dispense with any intervening electron-optical system such as the anode/lens A of FIG. 2. The switch SWd is operated as in the case of FIG. 2, while a source Bi (for electrodes E1 – E2) of plate Ix applies a constant P. D.

As will be appreciated, the colors seen by the observer need not be as pure as the primary colors used in color television displays, and this facilitates the construction and use of three-color "penetron" type screens having a sandwich or grain structure.

Figure 4:
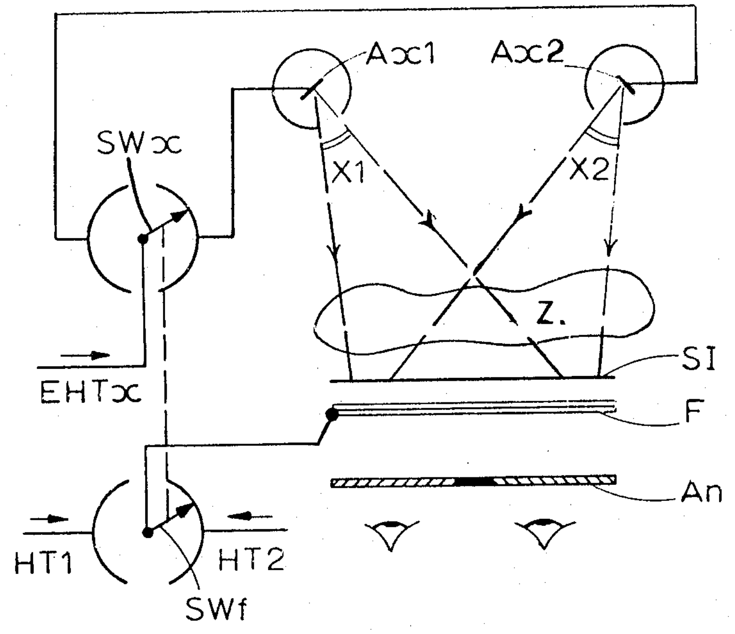
FIG. 4 to 7 show, diagrammatically various embodiments of the invention for obtaining stereoscopic views of an object.
Figure 5:
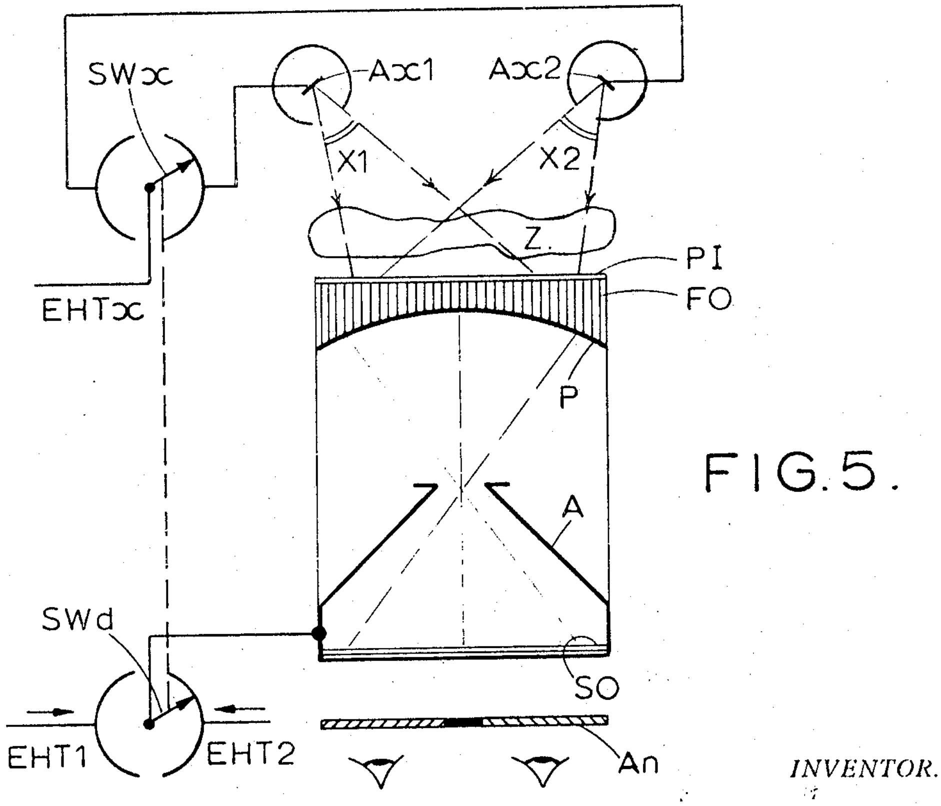
Figure 6:
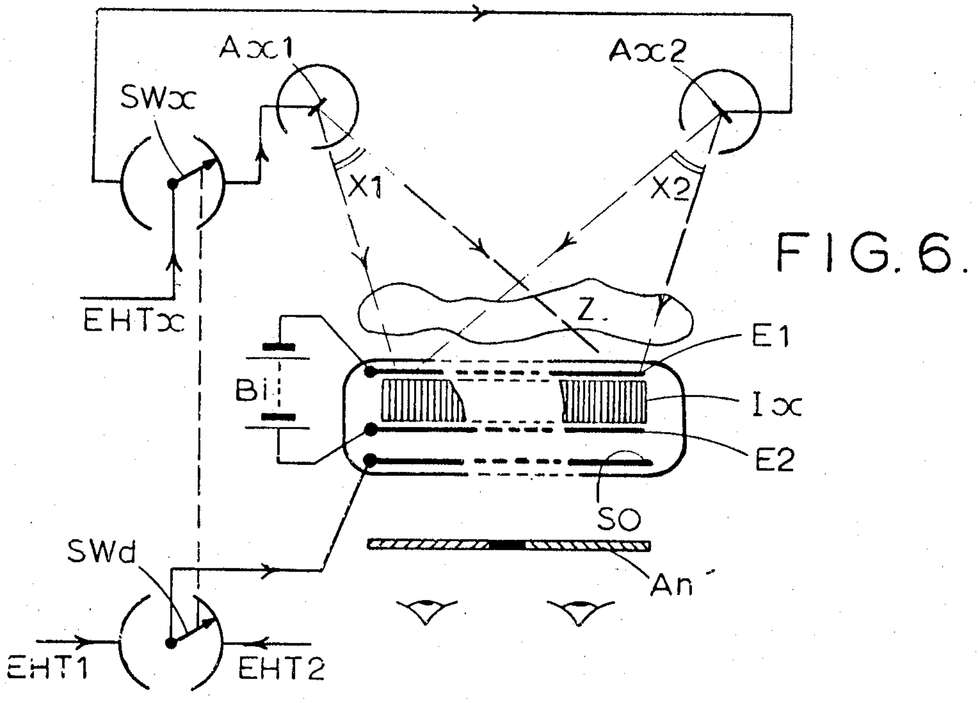

FIGS. 4 to 6 show arrangements corresponding to those of FIGS. 1 to 3 respectively but applied to two-color stereoscopic systems of the anaglyph type. In all cases the two (i.e. "left" and "right") X-ray images are shown, as aforesaid, overlapping on the input screen or on the input face of a channel plate (as will be appreciated, the overlap shown within the body Z is too small for practical purposes and the drawings should be regarded as purely schematic in this respect).

In the arrangement of FIG. 4, a left-hand X-ray tube having a target Ax1 generates X-rays X1 to form a left-hand X-ray image on a fluorescent screen SI which converts the image into a nominally black-and-white picture. Similarly, a second tube having a target Ax2 generates X-rays X2 to form on screen SI a right-hand image which overlaps the image produced by rays X1.

The double picture displayed by screen SI is viewed through a two-color switchable color filter F, the two colors being, for example, magenta and cyan. This filter is switched from one color to the other by a switch SWf which applied alternately two different potentials. This switch is synchronized with a switch SWx which switches the two X-ray tubes on and off alternately so as to resolve the overlapping X-ray images.

The filter F is viewed through anaglyph spectacles An having eye-pieces in the form of color filters of differing colors, e.g. one magenta and the other cyan.

In FIG. 5 the arrangement is similar except that the switchable filter F is replaced by an image intensifier tube of the electron-optical "diode" type having a two-color penetron screen SO. This screen is switched alternately between two different high-voltage levels (EHT1 and EHT2) by switch SWd in synchronism with the X-ray switch SWx.

As in the arrangement of FIG. 2, the input screen PI is shown coupled to the curved photo-cathode P by a fiber-optic plate FO which may form one wall of the envelope of the tube.

The output screen SO of the tube is, again, viewed through anaglyph spectacles An.

In FIG. 6, the screen PI and electron-optical diode tube P-A-SO are replaced by a proximity tube as described with reference to FIG. 3, except that the penetron screen SO is a two-color screen, e.g. magenta and cyan. The latter is viewed through anaglyph spectacles and the switches are two-position switches as in FIG. 5.

The anaglyph arrangement of FIG. 4 can be carried out with polarized light instead of colored light. Thus the filter F of FIG. 4 can be replaced by the combination of a polarization filter followed by a device known as a polarization switch (e.g. a Kerr cell). The filter passes only rays (from screen SI) which are polarized in one plane (e.g. the vertical plane) and the polarization switch rotates this plane by 90° when appropriately energized. The colored spectacles An are replaced by ones having a pair of polaroid or like filters orientated e.g. so that one eye only sees vertically polarized light and the other only sees horizontally polarized light.

Figure 7:
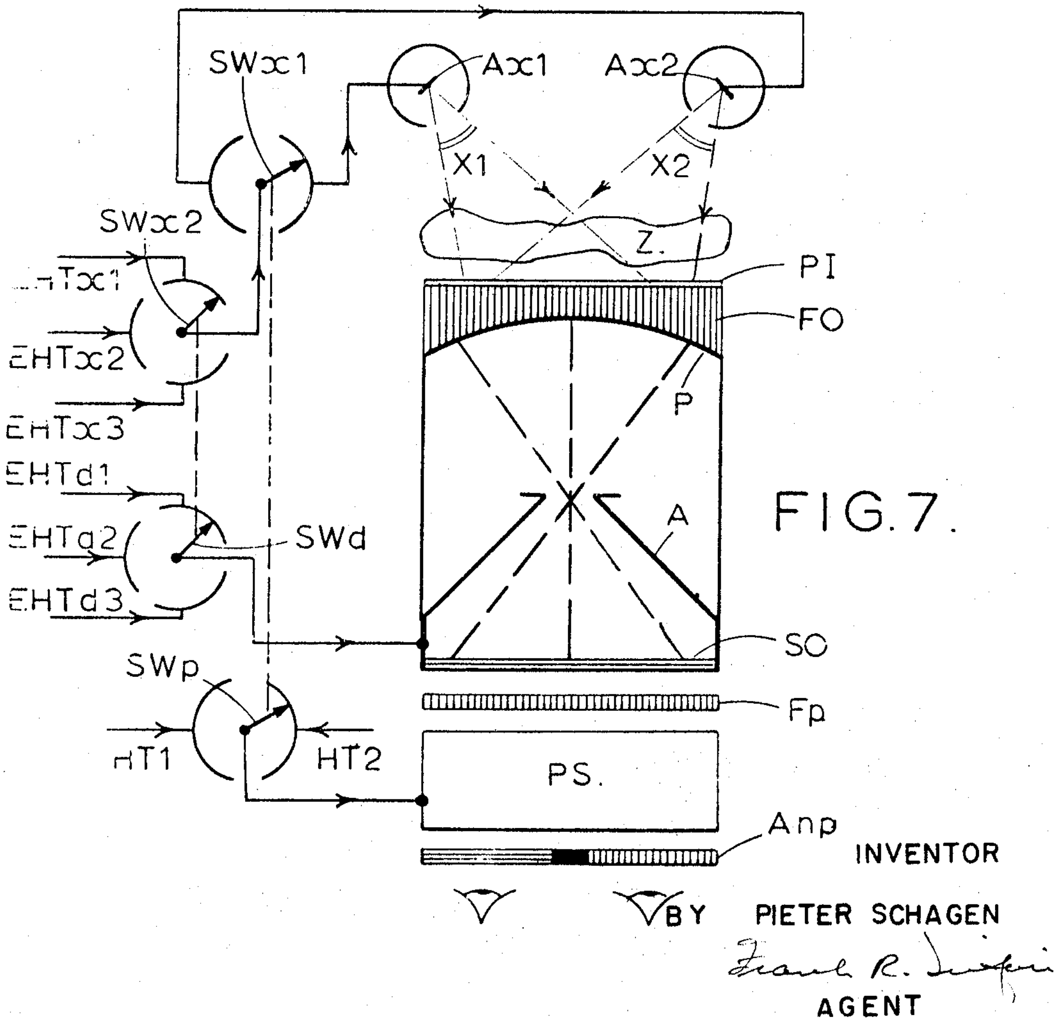

As a further variant, it is possible to obtain an X-ray image which is both colored (in accordance with changing X-ray hardness) and stereoscopic. An example of such an arrangement is given in FIG. 7 of the drawings in which all the elements up to the penetron screen SO correspond to those of FIG. 5 except that said screen is a three-color screen (red, green, and blue) and its control switch SWd has three corresponding positions. In addition, the two X-ray tubes can be controlled in hardness at one rate as well as being switched alternately on and off at a different rate.

The screen SO is followed by a polarization filter Fp which passes only rays which happen to be polarized in one plane, e.g. the vertical plane. Filter Fp is followed by a polarization switch PS which, as aforesaid, can rotate the plane of polarization through 90° (e.g. from vertical to horizontal) under the action of a switch SWp. Element PS is viewed through anaglyph spectacles Anp in which, say, one eye-piece passes vertically polarized light from SO and the other passes horizontally polarized light, such light being in three colors so that each eye sees alternately one fully colored image of a stereoscope pair.

In this arrangement the switch Swp controlling polarization must be synchronized to the switch SWx1 controlling the alternating on-off sequence of sources Ax1 – Ax2 while the color switch SWd is synchronized with a switch SWx2 controlling the hardness of both tubes through three different values EHTx1 – 3. For example, SWx2 may "rotate" (in the mechanical analogy used in the drawings) 360° while SWx2 "rotates" 180°. Alternately, SWx1 may "rotate" 360° while SWx2 "rotates" 120°.

What we claim is:

1. X-ray imaging and display apparatus comprising an X-ray source, means for switching said source sequentially between a plurality of voltages to produce X-rays of different energies, a multicolor image converter and display system capable of converting X-rays from said source into visible light of a given color including filter means electrically controlled to respond in one of a plurality of colors, and means to switch said image filter means simultaneously with said means for switching said X-ray source between said voltages to produce visible light of a given color corresponding to X-rays of a given energy said X-ray source employing two X-ray tubes so positioned as to provide a stereoscopic pair of pictures of an object, first switching means for switching the said two tubes alternately on and off at a given rate, second switching means for switching the X-ray source at a different rate between at least two voltages so as to generate X-rays of different energies, a multi-color image converter and display system capable of converting X-rays from said source into visible light at a given color including filter means electrically controlled to respond in one of a plurality of colors, and means for switching said filter means simultaneously with said means for switching said X-ray source between said voltages to produce light of a given color corresponding to X-rays of a given energy, a polarization filter, and a polarization switch with means for controlling the latter in synchronism with said first switching means so as to provide images which are stereoscopic and multi-colored when viewed through appropriate left and right polarization filters.

* * * * *

PO-1050
(5/69)

UNITED STATES PATENT OFFICE
CERTIFICATE OF CORRECTION

Patent No. 3,665,184 Dated May 23, 1972

Inventor(s) PIETER SCHAGEN

It is certified that error appears in the above-identified patent and that said Letters Patent are hereby corrected as shown below:

On the title page, under the category "Foreign Application Priority Data"

line 1, "41,704/69" should read --41,703/69--

Signed and sealed this 5th day of September 1972.

(SEAL)
Attest:

EDWARD M.FLETCHER,JR.
Attesting Officer

ROBERT GOTTSCHALK
Commissioner of Patents